L. A. ALEXANDER.
DISH WASHER.

No. 51,000. Patented Nov. 21, 1865.

Witnesses.
Jno. D. Patten
A. Moore

Inventor.
Levi A. Alexander
By M. C. Dodge
Attorney.

UNITED STATES PATENT OFFICE.

LEVI A. ALEXANDER, OF COLERAIN, MASSACHUSETTS.

MACHINE FOR WASHING DISHES.

Specification forming part of Letters Patent No. 51,000, dated November 21, 1865.

*To all whom it may concern:*

Be it known that I, LEVI A. ALEXANDER, of Colerain, in the county of Franklin and State of Massachusetts, have invented certain new and useful Improvements in Machines for Washing Dishes; and I do hereby declare that the following is a full, clear, and exact description thereof, reference being had to the accompanying drawings, making part of this specification, and to the letters of reference marked thereon, in which—

Figure 1:
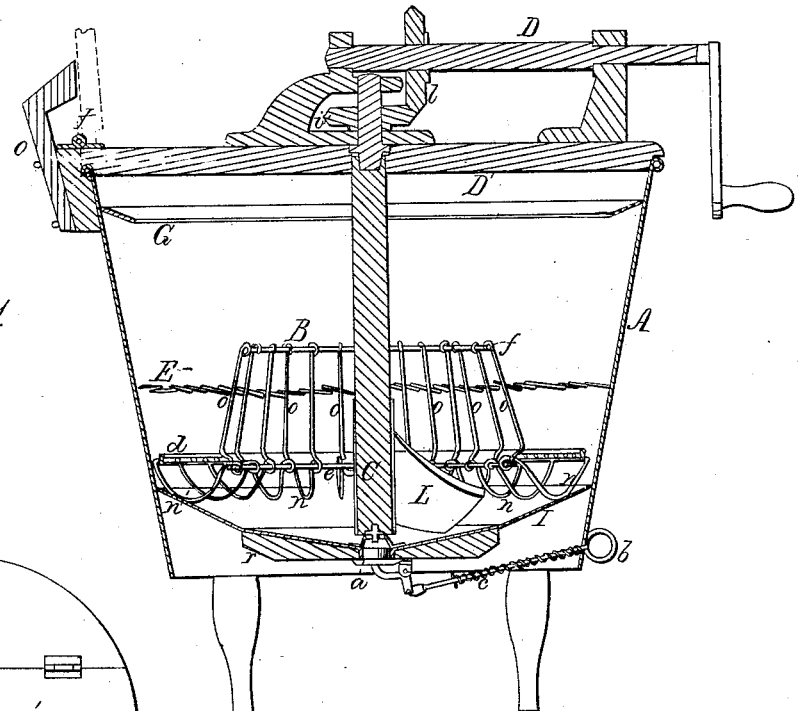
Figure 2:
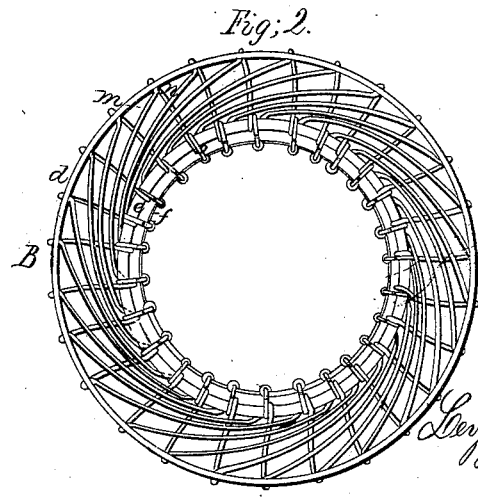

Figure 1 is a transverse vertical section of the machine ready for use. Fig. 2 is a top-plan view of the rack used for holding the dishes.

Similar letters wherever they occur in the various figures refer to similar parts.

The nature of my invention consists in a new style of rack for holding the dishes in place, a protecting-rim to prevent the water from being dashed against the cover and working out, a spring-valve for drawing off the water, and a single concave bottom.

To enable others skilled in the art to construct and use my invention, I will proceed to describe it.

My machine consists, in the main, of a suitable-sized pail-shaped tub, A, mounted on feet, as shown in Fig. 1, having a vertical shaft, C, located centrally therein, and provided with two spiral or curved wings. It has a cover, D', made in three sections, hinged together, on which is mounted a shaft, D, with two beveled-gear wheels, $i$ and $l$, for imparting motion to the shaft C. In these respects, with the exception of the cover, my machine is similar to the one patented to Gilbert Richards and myself on the 13th day of October, 1863.

My improvements consist, first, in securing upon the inside of the tub A, near its top, an inclined circular flange or rim, G, for the purpose of preventing the water, as it is thrown outward and upward on the sides of the tub by the wings L, from dashing against the under side of the cover and working out around the edges of the tub.

In our former machine the bottom of the tub was made nearly flat, and then had a secondary bottom placed above it.

I construct the bottom of my improved machine single, and give to it the inclination toward the center, as shown in Fig. 1. It will be observed that the central portion, where the wings revolve, is made nearly flat, it having only sufficient inclination toward the center to allow or insure the draining out of the water when the valve $a$ is opened. The outer portion of the bottom I has a greater inclination, so that after the water has been thrown outward among the dishes it will flow back again to the center, so as to come again within reach of the wings. On the under side of the bottom I secure a wooden block, $r$, which serves to strengthen the bottom and form a support for the valve $a$. This valve $a$ consists of a flat disk covered with rubber or leather attached to an elbow crank or lever, to the opposite end of which is secured a handle or stem, $b$, as shown in Fig. 7, and having thereon a spiral spring, $c'$, which serves to hold it shut tight. By pulling on the handle $b$ the valve can be opened at pleasure and the water allowed to escape into a dish placed underneath to receive it.

B is a rack, constructed principally of wire. This rack consists of a ring, $d$, of a size nearly equal in diameter to the diameter of the tub at the bottom, and an inner ring, $e$, of somewhat greater diameter than the wings L are wide. To these rings a series of wires are attached in the manner shown, commencing first at the ring $e$ and extending thence in a curved or spiral direction as shown by $m$, until it reaches the ring $d$, from whence it returns inward to the ring $e$, being curved downward in its course, as shown by $n$, after which it extends upward, as shown by the bars $o$, to the ring $f$, at the top, which is slightly smaller than the ring $e$. The rack B, thus constructed, is placed in the tub A, it resting on the bottom I, where the curved rods $n$ come in contact therewith, as shown in Fig. 1.

Around the interior of the tub A, a little lower than the top of the rack B, is secured a wire, E, bent so as to form a series of loops or projections, as shown in Fig. 1, for the purpose of securing and holding in position saucers and other small dishes. By curving the wires $m$, as shown, the plates and similar dishes, when placed in the rack, are made to occupy a position tangential, corresponding with the curved wires $m$, their lower edges resting on the rods n, which brings them in a proper position to permit the water to be thrown in between them, impinging both upon their front and rear surfaces, and thus washing them effectually. By supplying clean hot water after the dishes have been sufficiently washed with soap and water they are thoroughly rinsed, the water flowing off underneath them, when the valve a is opened, the heat of the dishes imparted by the hot water serving to dry them effectually.

Figure 3:
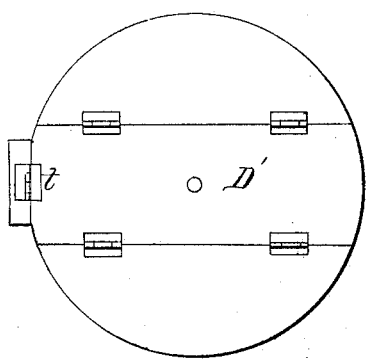

The cover D' consists of three sections, as shown in Fig. 3, the central section supporting the mechanism and having the two side sections hinged to the central piece, so that they can each be opened or turned up to put in or take out the dishes without opening the central section and disengaging the driving mechanism from the shaft C. The central section is hinged to the tub A, as shown at t, Fig. 1, so that it can be turned up, as shown in red, when it is desired to remove or replace the rack B or the shaft C.

Having thus fully described my invention, what I claim is—

1. The rim G, attached to the inside of the tub A, as and for the purpose set forth.

2. The rack B for holding the dishes, constructed substantially as herein described.

3. The single concave bottom I, having the inclinations, as shown, in combination with the wheel L, for the purpose of causing the water thrown outward by the wheel to flow back within reach of the wheel again, as described.

4. The cover D', having the two side pieces hinged to the central piece, and the latter hinged to the body, as shown, in combination with the detachable wheel L, all constructed and arranged to operate as herein shown and described.

LEVI A. ALEXANDER.

Witnesses:
 ORRIN M. GAINES,
 LYSANDER N. BROWNELL.